United States Patent
Khan et al.

(10) Patent No.: US 10,546,293 B2
(45) Date of Patent: Jan. 28, 2020

(54) APPARATUSES AND METHODS FOR USING A RANDOM AUTHORIZATION NUMBER TO PROVIDE ENHANCED SECURITY FOR A SECURE ELEMENT

(71) Applicant: Apple Inc., Cupertino, CA (US)

(72) Inventors: Ahmer A. Khan, Milpitas, CA (US); Jerrold V. Hauck, Windermere, FL (US); George R. Dicker, Sunnyvale, CA (US); Jeffrey C. Lee, Rockledge, FL (US); Mitchell D Adler, Los Gatos, CA (US); Wade Benson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1074 days.

(21) Appl. No.: 14/475,375

(22) Filed: Sep. 2, 2014

(65) Prior Publication Data

US 2015/0348022 A1 Dec. 3, 2015

Related U.S. Application Data

(60) Provisional application No. 62/004,832, filed on May 29, 2014.

(51) Int. Cl.
*G06Q 20/38* (2012.01)
*G06Q 20/32* (2012.01)

(52) U.S. Cl.
CPC ....... *G06Q 20/385* (2013.01); *G06Q 20/3226* (2013.01); *G06Q 20/3829* (2013.01)

(58) Field of Classification Search
CPC ..... H04W 12/06; H04W 12/10; H04W 12/04; H04W 8/245; H04W 8/265; H04W 88/02;
(Continued)

(56) References Cited

U.S. PATENT DOCUMENTS 5,732,138 A * 3/1998 Noll ................. G06F 7/582
380/28
5,867,577 A * 2/1999 Patarin ................. G06Q 20/341
705/67

(Continued)

FOREIGN PATENT DOCUMENTS

WO 2012091350 7/2012

*Primary Examiner* — Johann Y Choo
(74) *Attorney, Agent, or Firm* — Treyz Law Group; Jason Tsai

(57) ABSTRACT

A system for provisioning credentials onto an electronic device is provided. The system may include a payment network subsystem, a service provider subsystem, and one or more user devices that can be used to perform mobile transactions at a merchant terminal. The user device may communicate with the service provider subsystem in order to obtained commerce credentials from the payment network subsystem. The user device may include a secure element and a corresponding trusted processor. The trusted processor may generate a random authorization number and inject that number into the secure element. Mobile payments should only be completed if the random authorization number on the secure element matches the random authorization number at the trusted processor. The trusted processor may be configured to efface the previous random authorization number and generate a new random authorization number when detecting a potential change in ownership at the user device.

21 Claims, 9 Drawing Sheets

(58) Field of Classification Search
CPC .... H04W 8/183; H04L 67/082; H04L 9/0863; H04L 9/0866; H04L 63/164; G06F 9/4856; G06F 17/3033; G06F 21/552; G06Q 20/4012; G06Q 20/3227; G06Q 20/3829

See application file for complete search history.

(56) References Cited

U.S. PATENT DOCUMENTS

| | | | | |
|---|---|---|---|---|
| 5,892,828 | A * | 4/1999 | Perlman | H04L 63/083 713/183 |
| 5,907,621 | A * | 5/1999 | Bachman | G06Q 20/382 705/64 |
| 6,014,635 | A * | 1/2000 | Harris | G06Q 20/10 705/14.17 |
| 6,442,610 | B1 * | 8/2002 | Khanna | H04L 45/00 370/229 |
| 6,629,591 | B1 * | 10/2003 | Griswold | G07F 1/06 194/205 |
| 7,502,946 | B2 * | 3/2009 | Perkins | G06F 21/6245 380/22 |
| 7,515,712 | B2 * | 4/2009 | Wasilewski | H04L 63/0428 380/210 |
| 7,765,162 | B2 * | 7/2010 | Binder | G06Q 20/04 705/64 |
| 7,788,382 | B1 * | 8/2010 | Jones | H04L 69/14 709/227 |
| 7,904,389 | B2 * | 3/2011 | DiGioacchino | G06Q 20/04 705/44 |
| 8,145,561 | B1 * | 3/2012 | Zhu | G06Q 40/025 455/410 |
| 8,245,307 | B1 * | 8/2012 | Pharris | H04L 9/3234 713/176 |
| 8,286,005 | B2 * | 10/2012 | Matsuda | G06F 21/78 713/194 |
| 8,756,650 | B2 * | 6/2014 | Wolfson | H04L 63/08 726/1 |
| 2008/0051059 | A1 * | 2/2008 | Fisher | G06Q 20/20 455/410 |
| 2009/0313168 | A1 * | 12/2009 | Manessis | G06Q 20/20 705/44 |
| 2010/0205432 | A1 * | 8/2010 | Corda | G06F 21/335 713/159 |
| 2010/0281139 | A1 * | 11/2010 | Deprun | H04M 1/72522 709/219 |
| 2011/0161235 | A1 | 6/2011 | Beenau et al. | |
| 2012/0102477 | A1 * | 4/2012 | Kim | G06F 8/654 717/169 |
| 2012/0137140 | A1 * | 5/2012 | Berengoltz | G06F 21/31 713/189 |
| 2012/0171998 | A1 * | 7/2012 | Kang | G06F 21/88 455/411 |
| 2012/0260324 | A1 * | 10/2012 | Lenon | G06Q 20/38 726/6 |
| 2012/0290376 | A1 | 11/2012 | Dryer et al. | |
| 2013/0024947 | A1 * | 1/2013 | Holland | G06F 21/34 726/28 |
| 2013/0047226 | A1 * | 2/2013 | Radhakrishnan | G06F 21/33 726/6 |
| 2013/0060618 | A1 * | 3/2013 | Barton | G06Q 20/3223 705/14.23 |
| 2013/0167228 | A1 * | 6/2013 | Wong | G06F 21/62 726/19 |
| 2013/0191290 | A1 * | 7/2013 | Glendenning | G06Q 20/20 705/71 |
| 2013/0191341 | A1 * | 7/2013 | Alexander | G06F 11/1464 707/640 |
| 2013/0308838 | A1 * | 11/2013 | Westerman | G06K 9/0008 382/125 |
| 2014/0114846 | A1 | 4/2014 | Weiner | |
| 2014/0187200 | A1 * | 7/2014 | Reitter | H04W 12/08 455/410 |
| 2014/0200929 | A1 * | 7/2014 | Fitzgerald | G06F 21/88 705/4 |
| 2014/0289119 | A1 | 9/2014 | Brudnicki et al. | |

\* cited by examiner

APPARATUSES AND METHODS FOR USING A RANDOM AUTHORIZATION NUMBER TO PROVIDE ENHANCED SECURITY FOR A SECURE ELEMENT

CROSS-REFERENCE TO RELATED APPLICATION(S)

This application is related to U.S. Provisional Patent Application Ser. No. 61/899,737, entitled "Using Bioauthentication in Near-Field-Communication Transactions," by Inventor Ahmer A. Khan, filed on Nov. 4, 2013, to U.S. Provisional Patent Application Ser. No. 62/004,840, entitled "Methods for Operating a Portable Electronic Device to Conduct Mobile Payment Transactions," by Inventors Ahmer A. Khan et al., also filed on May 29, 2014, and to U.S. Provisional Patent Application Ser. No. 62/004,837, entitled "Methods for Managing Payment Applets on a Secure Element to Conduct Mobile Payment Transactions," by Inventor Ahmer A. Khan, also filed on May 29, 2014.

This application claims the benefit of provisional patent application No. 62/004,832, filed May 29, 2014, which is hereby incorporated by reference herein in its entirety.

BACKGROUND

This relates generally to electronic devices, and more particularly, to improving the security on an electronic device.

Portable electronic devices such as cellular telephones are sometimes provided with near field communications (NFC) circuitry that allows the electronic devices to perform contactless proximity-based communications with a corresponding NFC reader. Oftentimes, the NFC circuitry in a user device is used to carry out financial transactions or other secure data transactions that require the user device to verify and access a commerce credential such as a credit card credential. The secure data that is necessary for performing such mobile financial transactions is typically stored on a secure element within an electronic device. The electronic device may also include a processor that communicates with the secure element.

When a user obtains an electronic device, the user may elect to provision one or more payment cards onto the device, which results in secure data being provisioned onto the secure element. Consider, for example, a scenario in which the user decides to sell his/her device to another user. In such scenarios, it may be desirable for the original user to erase all secure data from the secure element before giving his/her device to the new user so that the new user would not be able to use the device to make payments with the original user's credentials. Commands for performing such deletion of secure data from the secure element are typically sent from the processor to the secure element. It is sometimes possible, however, for the processor to be infected with malicious software (or "malware") that can somehow prevent the secure data from being erased from the secure element (i.e., by preventing the deletion command from being sent to the secure element). In such instances, it is possible for the new user to use the newly acquired electronic device to perform mobile transactions without permission from the original owner.

This can be particularly problematic when a user loses his/her device or when a device is stolen from an authorized user. In such scenarios, it is possible for the new, unauthorized user to perform financial transactions using the lost/stolen phone. It would therefore be desirable to provide ways to improve the security of electronic devices.

SUMMARY

Apparatuses and methods of operating a portable electronic device to conduct mobile payment transactions while ensuring that the intended user is in possession of the device are provided.

In accordance with an embodiment, the electronic device may include a secure element and a corresponding trusted processor. The trusted processor may be used to generate a random authorization number and to inject the random authorization number into the secure element. The trusted processor may separately derive the authorization number. The electronic device may be used to conduct mobile payment transactions only when the random authorization number on the secure element matches the random authorization number that is derived at the trusted processor. Whenever the electronic device detects a potential risky event, the trusted processor may erase the previously generated random authorization number, generate a new random authorization number, and inject the newly generated random authorization number into the secure element. After injecting the newly generated random authorization number into the secure element, all payments applets on the secure element may be disabled so that the secure element can no longer be used to complete a financial transaction.

In accordance with another embodiment, the user device may include at least a secure element and a corresponding trusted processor that communicates with the secure element via a secure channel. The trusted processor may be part of a main applications processor on the user device or may be part of a separate secure enclave processor (as examples).

A user may be given the opportunity to provision one or more payment cards onto the electronic device (e.g., to provision commerce credentials onto the secure element). The user may be required to enable at least one user authentication mechanism such as a passcode lock function prior to provisioning payment card information onto the electronic device. Once the device has been provisioned with the payment cards (e.g., by retrieving commerce credentials from a payment network subsystem using a service provider subsystem), the electronic device may be used at a merchant terminal to carry out mobile payment transactions.

The electronic device may be configured to monitor for any events indicative of a potential change in ownership or other potentially risky event that can result in unauthorized usage of the device to perform payments. In response to detecting such types of events, the commerce credentials may be disabled so that the electronic device can no longer be used to conduct payments. In such instances, the trusted processor may be configured override a currently existing authorization random number "AuthRand" by generating a new AuthRand value and injecting the newly generated AuthRand value into the secure element. In response to detecting that the secure element has received a new AuthRand, commerce credentials may be subsequently removed from the user device using the service provider subsystem.

Potential risky behavior may include: detecting that the user has disabled the passcode lock function, detecting that the user has logged out of a network-based service account at the service provider subsystem, detecting that the user has elected to erase all contents and settings on the device, detecting a firmware update at the device, detecting a recovery mode installation at the device, etc. The user may also be provided with an opportunity to restore previously provisioned payment card information onto the device using backup data stored on a network-based service module at the service provider subsystem (e.g., a module on which the network-based service account is maintained). In some arrangements, the commerce credentials may be re-enabled for use at the device without requiring the user to re-provisioning any payment cards in response to detecting that the user who originally provisioned the commerce credentials is still in possession of the device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Figure 1:
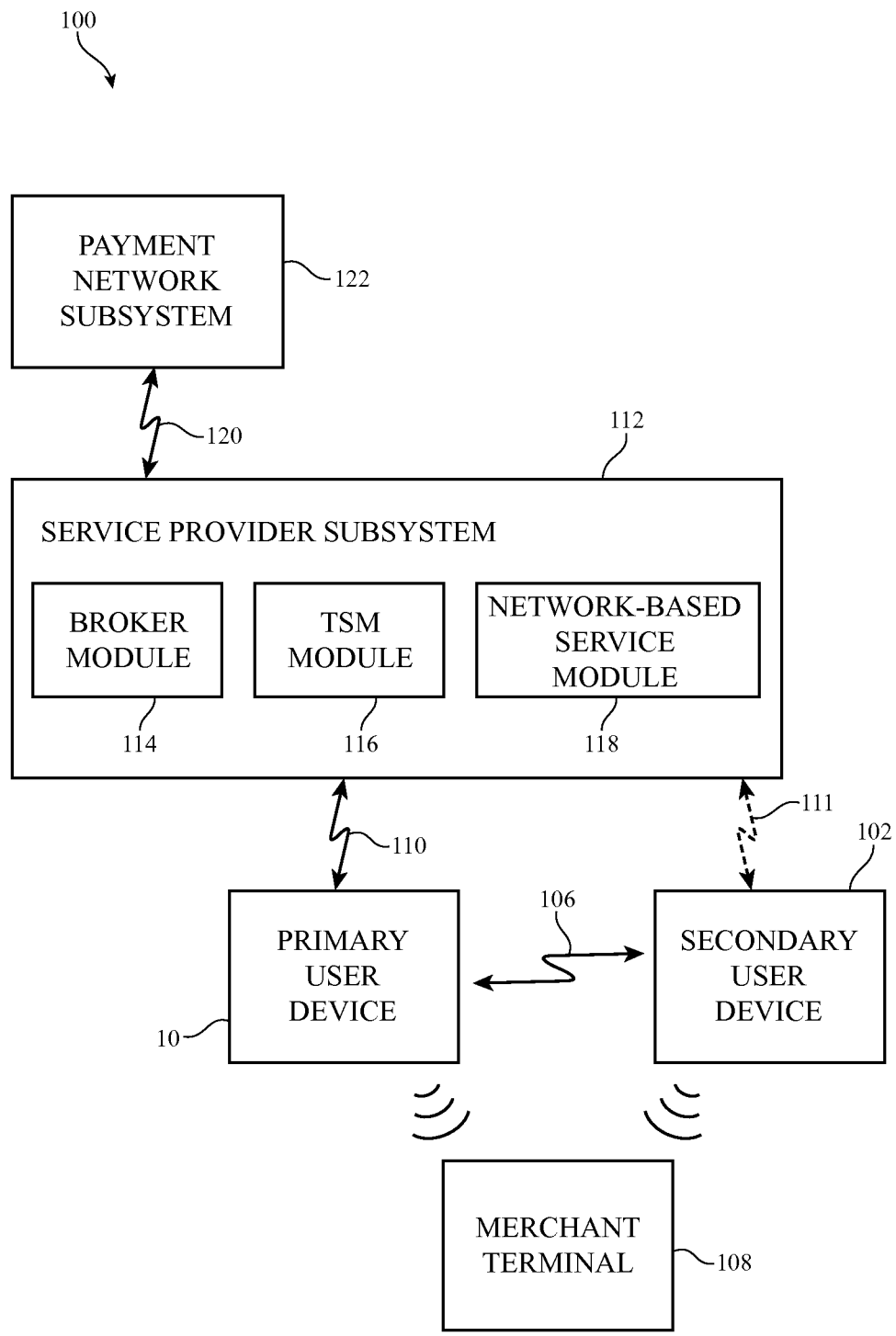
FIG. 1 is a diagram of an illustrative system for in which one or more user devices can be used to perform mobile payment transactions in accordance with an embodiment.

FIG. 1 shows a diagram of a system 100 in which credential information can be provisioned onto one or more electronic devices from a payment network subsystem 122 using a service provider subsystem 112. User devices that have been provisioned with credentials from payment network subsystem 122 may be used to conduct a financial transaction with a merchant terminal such as merchant terminal 108. User devices may, for example, communicate with merchant terminal 108 via contactless proximity-based communications (e.g., using near field communications (NFC) standards). Terminal 108 (sometimes referred to as a "point-of-sale" terminal) may include an NFC reader for detecting, reading, or otherwise receiving information from a nearby electronic device.

For example, a user may hold a provisioned electronic device within range of merchant terminal 108 to initiate a commercial transaction. Actual physical contact between the user device and the merchant terminal need not be present. While the electronic device is within range of merchant terminal 108 (e.g., when the user device is within 10 cm of terminal 108, when the user device is within 5 cm of terminal 108, when the user device is within 1 cm of terminal 108, or when the distance between the user device and the merchant terminal has other suitable values), the electronic device may send a selected credential to merchant terminal 108. In response to receiving the selected credential, merchant terminal 108 may complete the payment by forwarding the received credential to a corresponding payment processor (not shown). The payment processor may utilize the user credential to complete the transaction with payment network subsystem 122. This example in which payment transactions are performed via NFC is merely illustrative and does not limit the scope of the present invention. If desired, financial transactions may be carried out over Bluetooth® communications links, personal area network (PAN) communications links, wireless local area network (WLAN) communications links, or other short-range wireless communications links.

Payment network subsystem 122 may be operated by a financial entity that includes a network of various issuing banks and/or acquiring banks (e.g., payment processors). The financial entity at the payment network subsystem 122 may serve as a generic payment card association (e.g., a credit card association) that partners with one or more issuing/acquiring banks that are associated with different brands of commerce credentials and may sometimes be referred to as a payment network operator. The payment network operator and associated issuing/acquiring banks may be a single entity or separate entities.

For example, American Express may be both a payment network operator and an issuing/acquiring bank. As another example, Visa and MasterCard may be a payment network operator that partners with other issuing/acquiring banks such as Bank of America, Wells Fargo, and Chase, just to name a few. The issuing bank may be the financial institution that assumes primary liability for each user's capability to pay off debts incurred using a particular brand of payment card. Various types of payment cards that can be issued may include but are not limited to: credit cards, debit cards, charge charges, stored-value cards, fleet cards, and gift cards.

User payment card credentials may be provisioned from such financial entities onto user devices using a service provider subsystem such as service provider subsystem 112. Service provider subsystem 112 may be configured to provide another layer of security and/or to provide a more seamless user experience. For example, service provider subsystem 112 may be operated by a commercial service entity that offers various services to the user, which may include: an online store for selling/renting media to be played by the user device, an online store for selling/renting applications to be run on the user device, an online storage service for backing up and synchronizing data among multiple user devices, a remote device management service for tracking the location of the user device and remotely controlling that device, an online store that allows the user to purchase additional user devices or products (e.g., products manufactured by that commercial entity), etc. As another example, service provider subsystem 112 may be operated by a mobile network operator such as Verizon or AT&T.

In either scenario, the commercial entity at the service provider subsystem 112 may at least provide different users with their own personalized accounts for accessing the services offered by that commercial entity. Each user account may be associated with a personalized user identification (or account ID) and password that the user may use to log in into his/her account. Once logged in, the user may be presented with the opportunity to provision one or more commerce credentials (e.g., payment cards) onto the user device to enable the user device to purchase items using services offered by the commercial entity and/or to perform financial transactions at a merchant terminal 108.

In general, the commercial entity at the service provider subsystem 112 and the financial entity at the payment network subsystem 122 are considered separate entities. The commercial entity may leverage any known credential information associated with each of its user accounts to more securely determine whether a specific credential offered by the payment network operator ought to be provisioned onto a given user device. If desired, the commercial entity may also leverage its ability to configure or control various components of the user device (e.g., via software of firmware updates) in order to provide a more seamless experience for the user when he or she wants to provision a credential offered by the payment network operator onto a given user device.

As shown in FIG. 1, service provider subsystem 112 may include a broker module 114, a trusted service manager (TSM) module 116, and a network-based service module 118. Broker module 114 may serve to manage user authentication with a commercial entity user account and may also serve to manage the lifecycle and provisioning of credentials onto a user device. Broker module 114 may also be configured to control the user interface (e.g., the graphical user interface) that is displayed on the user device and to process any user inputs related to provisioning commerce credentials on the user device. When it is desired to provision a card onto the user device, broker 114 may send a notification to payment network subsystem 122 via path 120.

In response to receiving the notification from broker 114, payment network subsystem 122 may communicate directly with TSM module 116 to carry out credential provisioning operations on the user device. TSM 116 may serve to provide GlobalPlatform or other secure transactions based services so that TSM 116 can set up a secure channel between service provider subsystem 112 and a secure element within the user device. Commerce credential, payment card information, and/or other sensitive account data may then be conveyed to the secure element in the device via the secure channel. In general, TSM 116 may use public/private keys or other cryptographic schemes to ensure that communication between service provider subsystem 112 and the secure element within the user device is secure.

Network-based service module 118 may serve to allow users to store data such as music, photos, videos, contacts, multimedia messages, emails, calendars, notes, reminders, applications, documents, device settings, and other information on a network of computing servers so that data can be synchronized across multiple user devices (e.g., module 118 allows users to backup data that is stored on their devices onto servers associated with the service provider subsystem). This backup data can be used to restore a user device or to set up new user devices (as examples).

Network-based service module 118 may also be configured to allow users to find lost devices (sometimes referred to as a "Find My Device" feature), to share media among different devices, and/or to keep sensitive information (e.g., commerce credential information, website account login information, Wi-Fi® account information, etc.) up to date across different user devices. Any sensitive user information may be stored as part of a user "keychain" that can be stored on the user device(s) and/or on the network-based service module 118. Only the authorized user should have access to the keychain. Contents in the keychain may be protected using industry standard encryption techniques (e.g., using at least 128-bit AES encryption). Module 118 configured in this way is sometimes referred to as a "cloud" storage or cloud computing module.

Still referring to FIG. 1, a user may be in possession of multiple devices such as devices 10 and 102. Device 10 may be referred to as a "primary" user device, whereas device 102 may be referred to as a "secondary" user device. In general, the primary user device 10 may be provided with more functions than the secondary user device 102. For example, primary user device 10 may serve as the user's main device for use in accessing an entire array of services offered by service provider subsystem 112, for making telephone calls, for selecting new cards to be provisioned on one of devices 10 and 102, for capturing images, and for accessing the Internet, whereas secondary user device 102 may serve as an accessory device for use in accessing only a subset of the services provided by the commercial entity at the service provider subsystem 112. However, it should be understood that the terms "primary" and "secondary" are used for ease of description and that, in some instances, the "secondary" device implement functionality identical to or greater than the functionality implemented by the "primary" device.

Either one of primary user device 10 or secondary user device 102 can be used to perform a mobile payment transaction at merchant terminal 108. Each device that is capable of conducting such types of NFC-based financial transactions may be provided with a secure element. The secure element may serve as a tamper-resistant component (e.g., as a single chip or multichip secure microcontroller) that is capable of securely hosting applications and their confidential and cryptographic data in accordance with rules and security requirements set forth by well-identified trusted authorities such as GlobalPlatform. The secure element (SE) may be provided as a universal integrated circuit card (UICC), an embedded SE, a smart secure digital (SD) card, a microSD card, etc. Sensitive user information such as credit card information and other commerce credentials may be stored on the secure element. The secure element provides a secure domain that protects the user's credentials and processes desired payment transactions in a trusted environment without compromising the safety of the user's data. In general, each secure element may have its own unique identifier sometimes referred to herein as the SEID. No two secure elements should have the same SEID, and the SEID cannot be altered.

The example of FIG. 1 in which portable electronic devices 10 and 102 are use to perform payment transactions at a merchant terminal is merely illustrative and does not limit the scope of the present invention. In general, financial transactions may be performed on any computing equipment via an application running on the computing equipment (e.g., by performing an "in-app" purchase), via a commercial website on the Internet, or via other suitable commercial channels.

In one suitable arrangement, the user may operate the primary user device 10 to provision one or more payment cards directly on the primary user device. In such arrangements, credential information may be retrieved from the payment network subsystem 122 and/or the service provider subsystem 112 and may be downloaded to a secure element within device 10 via path 110. Path 110 between subsystem 112 and device 10 may be supported via cellular telephone radio communications protocols or other long-range wireless communications technologies and/or via Bluetooth®, IEEE 802.11 protocols—sometimes referred to as WiFi®, or other short-range wireless communications technologies.

In another suitable arrangement, the user may operate the primary user device 10 to indirectly provision one or more payment cards on the secondary user device 102. In such scenarios, the provisioning of credentials onto the secondary device 102 may be managed using a secondary device credential management application (sometimes referred to as a "bridging" application) running on the primary user device 10. In such arrangements, payment network subsystem 122 may provide the desired payment card information that is then securely written into a secure element on the secondary device 102 via the primary user device 10 and path 106. The communications path 106 between primary user device 10 and secondary user device 102 may be supported via Bluetooth®, IEEE 802.11 protocols—sometimes referred to as WiFi®, or other short-range wireless communications technologies (as examples). In yet other suitable arrangement, secondary device 102 may communicate directly with service provider subsystem 112 to obtain commerce credentials using any suitable long-range or short-range wireless communications standards (as indicated by path 111).

Figure 2A:
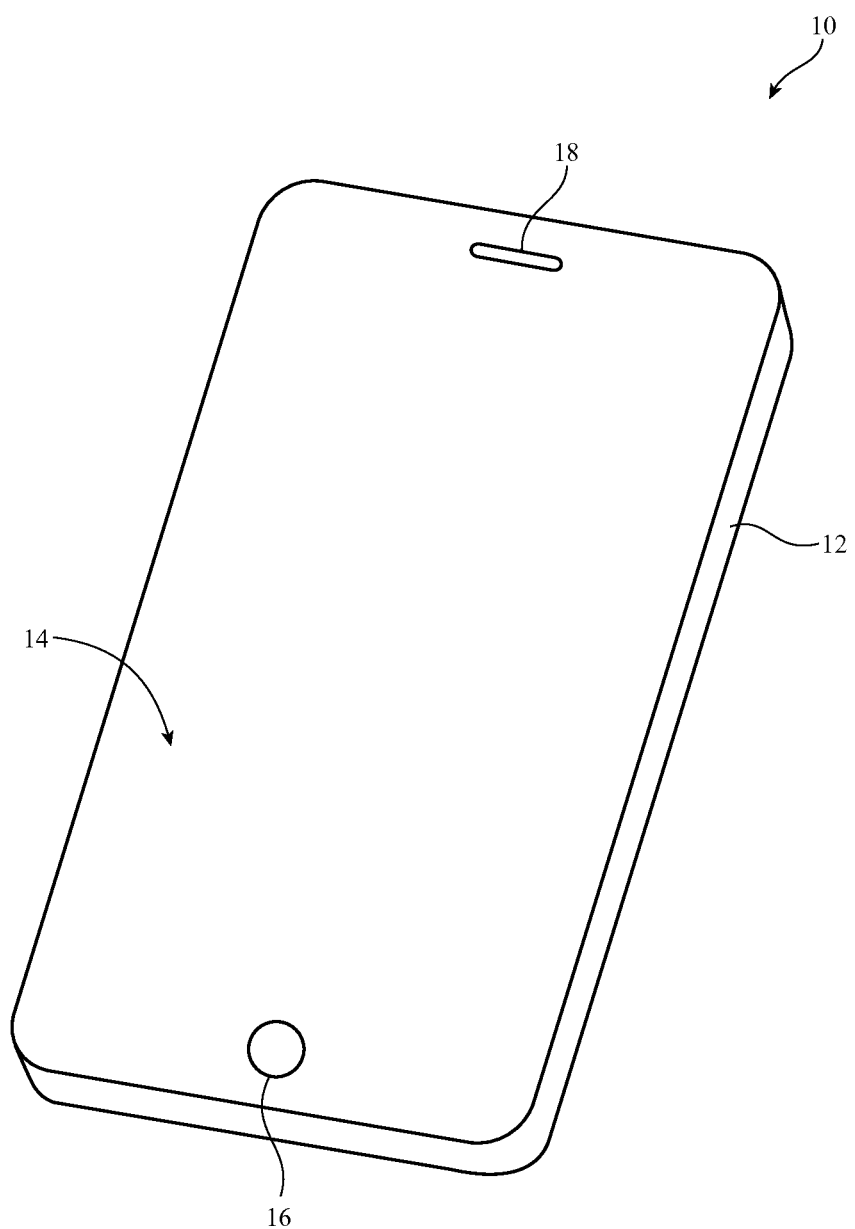
FIG. 2A is a perspective view of an illustrative primary user device in accordance with an embodiment.

FIG. 2A shows a perspective view of primary user device 10. Device 10 may be a portable device such as a cellular telephone, media player, tablet computer, or other portable computing device. The example of FIG. 2A is merely illustrative. Other configurations may be used for device 10, if desired. As shown in FIG. 2A, device 10 may include a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18. Openings may be formed in housing 12 to form communications ports (e.g., an audio jack port, a digital data port, etc.).

Figure 2B:
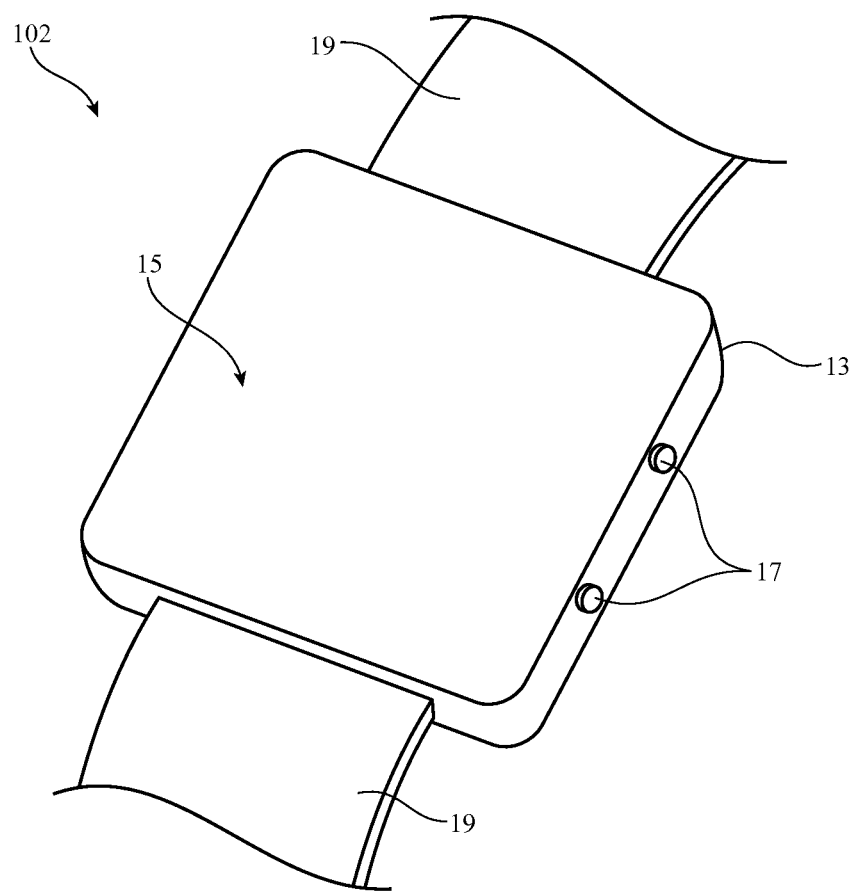
FIG. 2B is a perspective view of an illustrative secondary user device in accordance with an embodiment.

FIG. 2B shows a perspective view of a secondary user device 102. Electronic device 102 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In at least some embodiments, secondary user device 102 serves as an auxiliary device to primary device 10, where device 102 can be used to perform specialized functions for the user.

The example of FIG. 2B in which device 102 is shown as a wearable device such as a wrist-watch device with straps 19 is merely illustrative. As shown in FIG. 2B, device 102 may include a display such as display 15. Display 15 has been mounted in a housing such as housing 13. Housing 13, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 13 may be formed using a unibody configuration in which some or all of housing 13 is machined or molded as a single structure or may be formed using multiple structures (e.g., an internal frame structure, one or more structures that form exterior housing surfaces, etc.).

Display 15 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 15 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. Display 15 may be protected using a display cover layer such as a layer of transparent glass or clear plastic.

Device 102 may have one or more buttons 17 which may be used to gather user input. Buttons 17 may be based on dome switches or other switch circuitry. Buttons 17 may include button members that form push buttons (e.g., momentary buttons), slider switches, rocker switches, etc. Device 10 may also have additional buttons, a speaker port, data ports such as a digital data port and an audio connector port, and/or other input-output devices, if desired. In some embodiments, at least one of buttons 17 on the secondary user device 102 may be used to enable device 102 for a secure mobile transaction.

Figure 3:
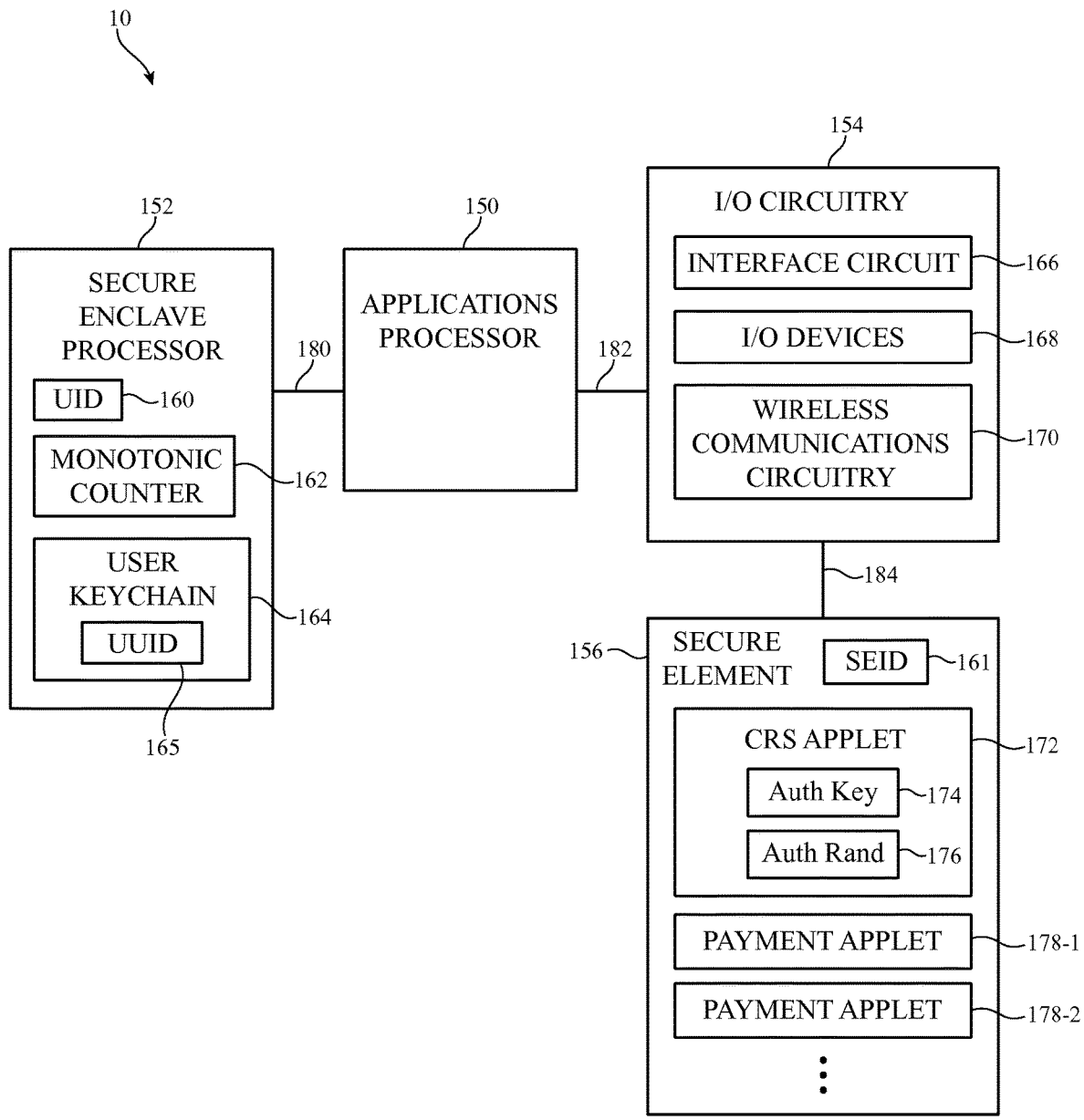
FIG. 3 is a schematic diagram of illustrative circuitry in the primary user device of FIG. 1 in accordance with an embodiment.

A schematic diagram showing illustrative components that may be used in device 10 is shown in FIG. 3. As shown in FIG. 3, device 10 may include control circuitry such as a main processor (sometimes referred to herein as the applications processor or AP) 150, input-output circuitry 154, a secure element such as secure element 156, and a trusted processor such as secure enclave processor (SEP) 152. Applications processor 150 may be used to control the operation of device 10 and may access storage such as hard disk drive storage, nonvolatile memory (e.g., flash memory or other electrically-programmable-read-only memory configured to form a solid state drive), volatile memory (e.g., static or dynamic random-access-memory), etc. This processing circuit may be based on one or more microprocessors, microcontrollers, digital signal processors, application specific integrated circuits, etc.

In general, processor 150 may be used to run software on device 10, such as internet browsing applications, voice-over-internet-protocol (VOIP) telephone call applications, email applications, media playback applications, operating system functions, secondary device credential management applications, etc.

Applications processor 150 may be coupled to input-output (I/O) circuitry 154 via path 182. Input-output circuitry 154 may include input-output devices 168. Input-output devices 168 may be used to allow data to be supplied to device 10 and to allow data to be provided from device 10 to external devices. Input-output devices 168 may include user interface devices, data port devices, and other input-output components. For example, input-output devices 168 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 154 may also include wireless communications circuitry 170 for communicating wirelessly with external equipment. Wireless communications circuitry 170 may include processing circuitry (sometimes referred to as baseband processors) that is used in implementing communications protocols to support interactions with external equipment. In one suitable arrangement, each baseband processor may be coupled to one respective transceiver circuit. In other suitable arrangements, a baseband processor may be shared among one or more transceiver circuits. The baseband processing circuitry and the main processor 150 are sometimes referred to collectively as control circuitry.

The baseband processing circuitry may receive digital data to be transmitted from processor 150 and may supply corresponding signals to a wireless transmitter for wireless transmission. During signal reception operations, a wireless receiver may receive radio-frequency signals from external sources (e.g., wireless base stations, wireless access points, GPS satellites, NFC readers, etc.). The baseband processing circuitry may convert signals received from the wireless receiver into corresponding digital data. In general, the functions of the baseband processing circuitry are provided by one or more integrated circuits. Communications protocols that may be implemented using the baseband processing circuitry may include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

For example, circuitry 170 may include wireless local area network transceiver circuitry for handling the 2.4 GHz and 5 GHz bands for WiFi® (IEEE 802.11) communications and the 2.4 GHz Bluetooth® communications band, cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples), satellite navigation system circuitry such as global positioning system (GPS) receiver circuitry for receiving GPS signals at 1575 MHz or for handling other satellite positioning data, near-field communications circuitry for producing and receiving near-field communications signals at 13.56 MHz to support communications between device 10 and/or a near-field communications reader or other external near-field communications equipment, and/or other suitable types of wireless transmitters/receivers for supporting long-range wireless links or short-range wireless links. Long-range links are typically used to convey data over thousands of feet or miles. Short-range links are typically used to convey data over tens or hundreds of feet. Near-field communications links typically are generally formed over distances of 20 cm or less (i.e., device 10 must be placed in the vicinity of the near-field communications reader for effective communications). These examples are merely illustrative and do not serve to limit the scope of the present invention. If desired, wireless communications circuitry 170 may be configured to support any suitable wireless communications protocols.

Wireless communications circuitry 170 may also include antennas. The antennas may be formed using any suitable antenna types. For example, the antennas may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. In addition to supporting cellular telephone communications, wireless local area network communications, and other far-field wireless communications, the structures of the antennas may be used in supporting near-field communications. The structures of the antennas may also be used in gathering proximity sensor signals (e.g., capacitive proximity sensor signals).

Input-output circuitry 154 may also include an interface circuit 166 for linking applications processor 150 to secure element 156 (e.g., via path 184). As shown in FIG. 3, secure element 156 may include one or more applications or "applets" that run as part of the operating system of secure element 156 (e.g., as a plug-in to a Java runtime environment executing on SE 156). For example, secure element 156 may include an authentication applet 172 that provides contactless registry services (CRS), encrypts/decrypts data that is sent to and received from a trusted processor, sets one or more flags (e.g, an authentication complete flag) in the operating system of SE 156, and/or conveys information to one or more payment applets 178 (e.g., payment applets 178-1, 178-2, etc.). Authentication applet 172 is therefore sometimes referred to as a CRS applet. Commercial credentials associated with a given payment card may be stored in a particular "container" on secure element 202, which is basically the instantiation of a payment applet combined with the encrypted payment data for that instantiation. For example, if two Visa cards are to be provisioned onto the secure element, a Visa payment applet would be instantiated twice into two different containers on the secure element. Each container may have a unique identifier known as an application ID (or AID).

In one suitable arrangement, applications processor 150 on primary user device 102 may be configured to run a mobile payments application. This payments application may allow the user to store credit cards, debit cards, retail coupons, boarding passes, event tickets, store cards, gift cards, loyalty cards, generic cards, and/or other forms of mobile payment. Each of these digital cards, coupons, or tickets is sometimes referred to as a "pass." As a result, the mobile payments application is sometimes referred to as a "passbook" application or a digital wallet application. The passbook application may include passes corresponding to respective payment applets 178 for use in paying for a financial transaction. Each pass (sometimes referred to herein as passbook pass, a digital wallet pass, etc.) in the passbook may be either in an activated (or personalized) state or a disabled (non-personalized or personalizing) state. A personalized pass may indicate that a corresponding payment applet 178 has been provisioned with the desired commerce credential and is ready for payment. A non-personalized pass may indicate that a corresponding payment applet 178 has not yet been provisioned with the necessary commerce credential and is therefore not payment-ready.

CRS applet 172 may be executed in a master or "issuer" security domain (ISD) in secure element 156, whereas payment applet(s) 178 may be executed in supplemental security domains (SSDs). For example, keys and/or other suitable information for creating or otherwise provisioning one or more credentials (e.g., credentials associated with various credit cards, bank cards, gift cards, access cards, transit passes, etc.) on device 10 and/or for managing credential content on device 102 may be stored on the CRS applet 172. Each payment applet 178 may be associated with a specific credential (e.g., a specific credit card credential, a specific public transit pass credential, etc.) that provide specific privileges or payment rights to device 10. Communications between these security domains may be encrypted using different encryption/decryption keys that are security-domain specific (e.g., each SSD may have its own manager key associated with a respective payment applet 178 that is used to activate/enable a specific credential of that SSD for use during an NFC-based transaction at merchant terminal 108).

Secure element 156 may be configured to only communicate with secure enclave processor 152. Messages conveyed between SE 156 and SEP 152 may be passed through applications processor 150 and interface circuit 166 via paths 180, 182, and 184. Secure enclave processor 152 may include one or more processors, a secure boot read-only memory (ROM), one or more security peripherals, and/or other components. The security peripherals may include hardware configured to assist in the secure services performed by processor 152, such as authentication hardware for implementing various user authentication techniques (e.g., a biometric sensor such as a fingerprint sensor, a retinal sensor, a palm sensor, a signature-identification sensor, just to name a few), encryption hardware configured to perform encryption, secure-interface controllers configured to communicate over the secure interface to other components, etc. Secure enclave processor 152 may only be accessed via a carefully controlled interface, thus forming a secure enclave for processor 152 and its peripheral components. Managed in this way, direct unauthorized access to components within secure enclave processor 152 may be prevented.

In one suitable embodiment, each secure element 156 may be paired with one corresponding secure enclave processor 152 using an authorization key or "AuthKey." This pairing of a secure element with a secure enclave processor using AuthKey should only be performed once during the manufacturing of these components. The AuthKey for a given secure element and secure enclave processor pair may be derived based on an unique SEID 161 of the secure element in that given pair and/or a unique identifier (UID) 160 of the secure enclave processor in that given pair. The AuthKey serves as a component-level secret key that is not known to the user and serves to bind a secure element to a corresponding processor so the secure element knows who to trust (e.g., the AuthKey helps to set up a secure channel between the secure element and the associated SEP).

The AuthKey can be stored within the secure element (e.g., AuthKey 174 may be stored at the CRS applet 172 on secure element 156) but need not be stored at the secure enclave processor. The secure enclave processor may be capable of re-deriving the AuthKey on-the-fly when it needs to communicate with the paired secure element based on at least one of its own UID 160 and/or the SEID 161 obtained from the corresponding secure element. Processor 152 that is capable of generating AuthKey for performing secure communication with secure element 156 is sometimes referred to herein as "a trusted processor."

While the AuthKey effectively binds the secure element to the trusted processor, a random authorization number "AuthRand" may be used to bind the user to the trusted processor. The AuthRand may be derived based on a user keychain (e.g., keychain 164 that is maintained at secure enclave processor 152) and the value of a monotonic counter 162 on secure enclave processor 152. As an example, the user keychain 164 may include a universal unique identifier (UUID) 165 that is related to a particular user. Counter 162 may be configured to monotonically increment its count value when a new user is detected. Since the AuthRand values are partly derived from the monotonic counter value and the UUID 165, the trusted processor can ensure that AuthRand values generated for each new user is unique. The trusted processor therefore also serves to locally track any ownership change at user device 10.

AuthRand can be stored within the secure element (e.g., AuthRand 176 may be stored at the CRS applet 172 on secure element 156) but need not be stored at the trusted processor. In general, the trusted processor may be configured to generate a new AuthRand value and to inject the newly generated AuthRand value into the corresponding secure element 172 (e.g., by overwriting the old AuthRand value on the secure element with the new AuthRand value) in response to detecting an ownership change at the user device.

In certain embodiments of the invention, any currently provisioned payment applets 178 should be immediately disabled for payment in response to detecting receipt of a new AuthRand. Operated in this way, the protection of sensitive user credentials at the secure element is enhanced by using the trusted processor to ensure that a new user obtaining device 10 as a result of an ownership change (whether or not the ownership change is intended) will not be able to use the newly acquired device to perform mobile transactions commerce credentials associated with the original user.

Figure 4:
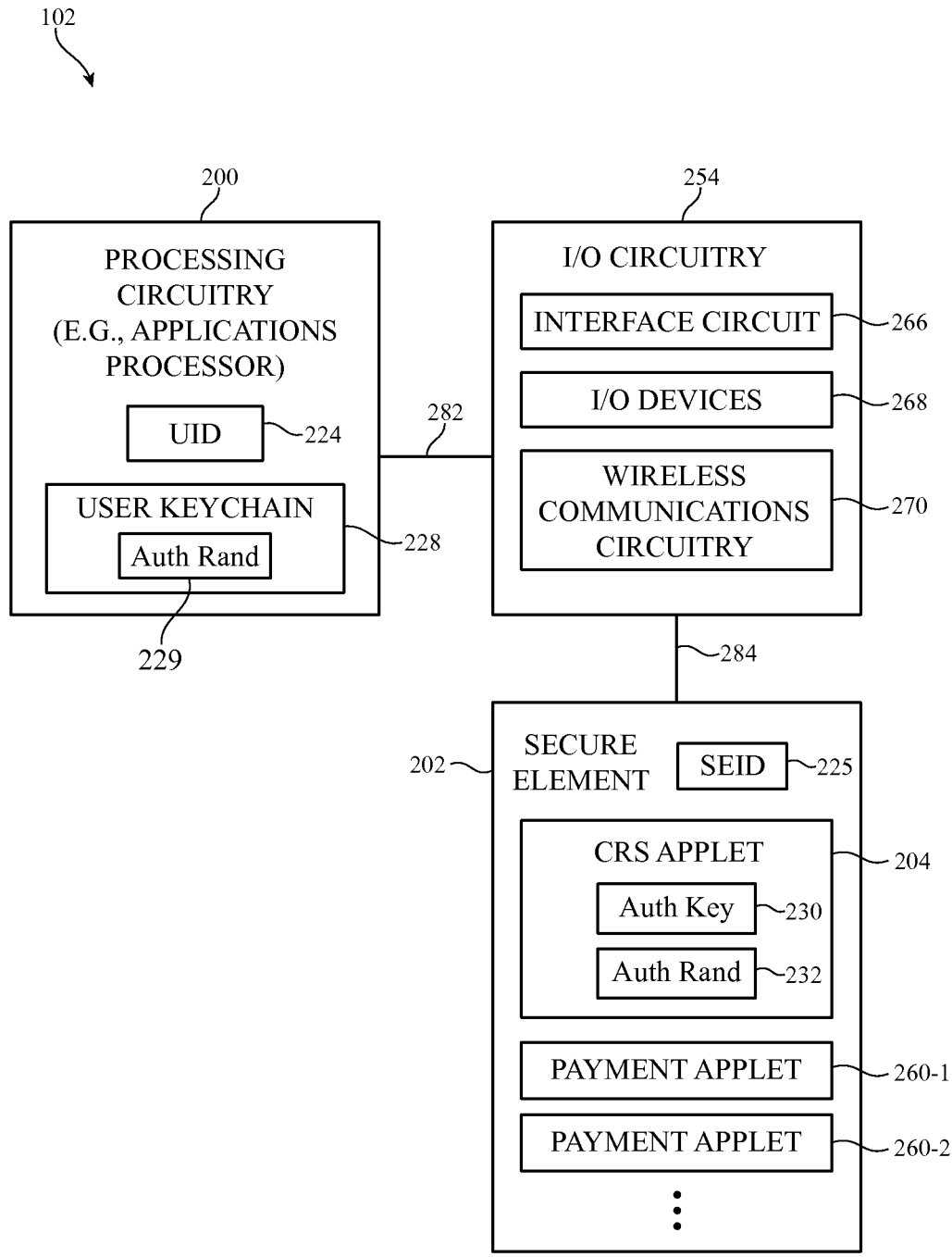
FIG. 4 is a schematic diagram of illustrative circuitry in the secondary user device of FIG. 1 in accordance with an embodiment.

A schematic diagram showing illustrative components that may be used in the secondary user device 102 is shown in FIG. 4. As shown in FIG. 4, device 102 may include control circuitry such as a main processor (sometimes referred to herein as the applications processor or AP) 200, input-output circuitry 254, and a secure element such as secure element 202. Applications processor 200 may be used to control the operation of device 102 and may access storage such as hard disk drive storage, nonvolatile memory (e.g., flash memory or other electrically-programmable-read-only memory configured to form a solid state drive), volatile memory (e.g., static or dynamic random-access-memory), etc. This processing circuit may be based on one or more microprocessors, microcontrollers, digital signal processors, application specific integrated circuits, etc.

In general, processor 200 may be used to run software on device 102, such as internet browsing applications, voice-over-internet-protocol (VOIP) telephone call applications, email applications, media playback applications, operating system functions, etc. Applications processor 200 may be coupled to input-output (I/O) circuitry 254 via path 282. Input-output circuitry 254 may include input-output devices 268. Input-output devices 268 may be used to allow data to be supplied to device 102 and to allow data to be provided from device 102 to external devices. Input-output devices 268 may include user interface devices, data port devices, and other input-output components. For example, input-output devices 268 may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 254 may also include wireless communications circuitry 270 for communicating wirelessly with external equipment. Wireless communications circuitry 270 may include processing circuitry (sometimes referred to as baseband processors) that is used in implementing communications protocols to support interactions with external equipment. In one suitable arrangement, each baseband processor may be coupled to one respective transceiver circuit. In other suitable arrangements, a baseband processor may be shared among one or more transceiver circuits. The baseband processing circuitry and the main processor 200 are sometimes referred to collectively as control circuitry.

In general, the functions of the baseband processing circuitry are provided by one or more integrated circuits. Communications protocols that may be implemented using the baseband processing circuitry may include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

For example, circuitry 270 may include wireless local area network transceiver circuitry for handling the 2.4 GHz and 5 GHz bands for WiFi® (IEEE 802.11) communications and the 2.4 GHz Bluetooth® communications band, near-field communications circuitry for producing and receiving near-field communications signals at 13.56 MHz to support communications between device 10 and/or a near-field communications reader or other external near-field communications equipment, and/or other suitable types of wireless transmitters/receivers for supporting short-range wireless links and long-range wireless links. These examples are merely illustrative and do not serve to limit the scope of the present invention. If desired, wireless communications circuitry 270 may be configured to support any suitable wireless communications protocols.

Wireless communications circuitry 270 may also include antennas. The antennas may be formed using any suitable antenna types. For example, the antennas may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands.

Input-output circuitry 254 may also include an interface circuit 266 for linking applications processor 200 to secure element 202 (e.g., via paths 282 and 284). As shown in FIG. 4, secure element 156 may include one or more applets that run as part of the operating system of secure element 202 (e.g., as a plug-in to a Java runtime environment executing on SE 202). In the example of FIG. 4, secure element 202 may include a CRS applet 204 that conveys information to one or more payment applets 260 (e.g., payment applets 260-1, 260-2, etc.). Each payment applet 260 may serve to store one commerce credential (e.g., to store information for one payment card).

In one suitable arrangement, applications processor 200 on secondary user device 102 may be configured to run a mobile payments application (i.e., the passbook application or the digital wallet application). This payments application may allow the user to store credit cards, debit cards, retail coupons, boarding passes, event tickets, store cards, gift cards, loyalty cards, generic cards, and/or other forms of mobile payment (sometimes referred to as "passes"). The passbook application may include passes corresponding to respective payment applets 260 for use in paying for a financial transaction.

As shown in FIG. 4, the secondary user device 102 may not be provided with a separate secure enclave processor. In this arrangement, applications processor 200 may serve as the "trusted processor" that communicates with the secure element 202 via interface circuit 266 and paths 282 and 284.

In one suitable embodiment, each secure element 202 may be paired with one corresponding applications processor 200 using an AuthKey. This pairing of a secure element with the trusted processor using AuthKey should only be performed once during the manufacturing of these components. The AuthKey for a given secure element and applications processor pair may be derived based on an unique SEID 225 of the secure element in that given pair and/or a unique identifier (UID) 224 of the applications processor in that given pair. The AuthKey helps to set up a secure channel between the secure element and the associated applications processor.

The AuthKey can be stored within the secure element (e.g., AuthKey 230 may be stored at the CRS applet 204 on secure element 202) but need not be stored at applications processor 200. The applications processor on the secondary user device 102 may be capable of re-deriving the AuthKey on-the-fly when it needs to communicate with the paired secure element based on at least one of its own UID 224 and/or the SEID 225 obtained from the corresponding secure element.

While the AuthKey effectively binds the secure element to the trusted processor 200, a random authorization number "AuthRand" may be used to bind the user to the trusted processor 200. In the case of the secondary user device 102, AuthRand may be a randomly generated number that is stored on the user keychain (e.g., AuthRand 229 may be stored as part of keychain 228 that is maintained at the applications processor 200). As described above in connection with FIG. 1, the user keychain 228 may include information that is only related to a particular user. In contrast to the trusted processor 152 of FIG. 3, the trusted processor 200 of FIG. 4 may not include a counter circuit.

AuthRand can also be stored within the secure element (e.g., AuthRand 232 may be stored at the CRS applet 204 on secure element 202). In general, the trusted processor may be configured to generate a new AuthRand value and to inject the newly generated AuthRand value into the corresponding secure element 202 (e.g., by overwriting the old AuthRand value on the secure element with the newly generated AuthRand value) in response to detecting an ownership change at the user device. The trusted processor (e.g., applications processor 200) serves to locally track any ownership change at user device 102 by monitoring the status of the user keychain (as an example).

In certain embodiments of the invention, any currently provisioned payment applets 260 on secure element 202 may be immediately deactivated for payment in response to detecting injection of a new AuthRand. Operated in this way, the protection of sensitive user credentials at the secure element is enhanced by using the trusted processor to ensure that a new user obtaining device 102 as a result of an ownership change (whether or not the ownership change is intended) will not be able to use the newly acquired device to perform mobile transactions commerce credentials associated with the original user.

Figure 5:
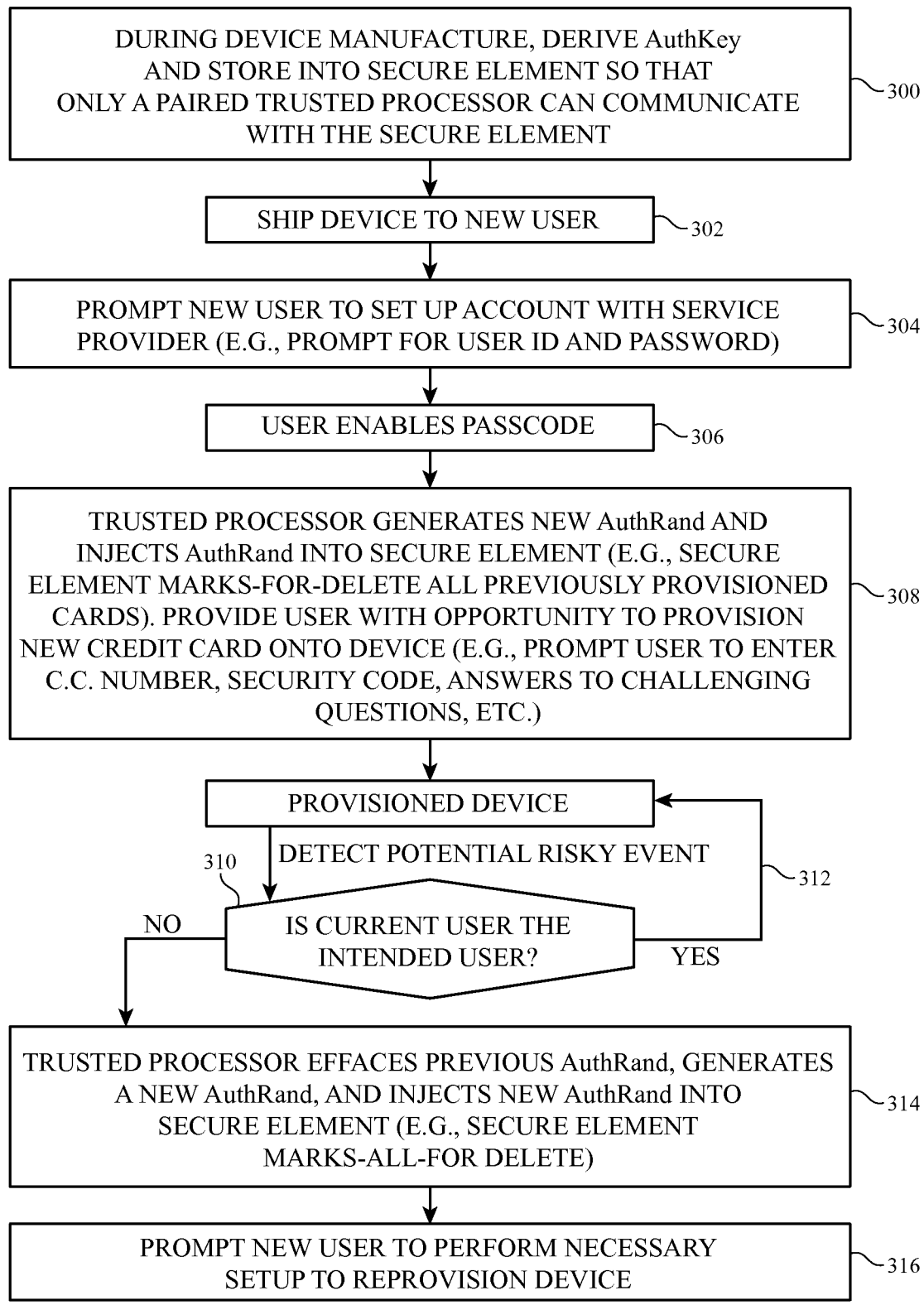
FIG. 5 is a flow chart of illustrative steps for provisioning credentials onto an electronic device in accordance with an embodiment.

FIG. 5 is a flow chart of illustrative steps for provisioning credentials onto an electronic device in accordance with an embodiment. The steps of FIG. 5 are generic to both the primary user device 10 of FIGS. 2A and 3 and the secondary user device 102 of FIGS. 2B and 4. At step 300, an AuthKey is derived during manufacturing and is stored onto the secure element so that only a paired trusted processor (e.g., secure enclave processor 152 of FIG. 3 or applications processor 200 of FIG. 4) is able to communicate securely with the secure element. At step 302, the electronic device (e.g., the primary user device 10 of FIG. 3 or the secondary user device 102 of FIG. 4) may be shipped to a new user.

At step 304, the device may prompt the new user to set up an account with the service provider subsystem (e.g., subsystem 112 in FIG. 1). For example, the user may be given the opportunity to enter an account identifier (ID) and a corresponding password to set up a new account. Once the account has been set up, the device may be considered to be personalized to that user and the user may now operate the device to play music, capture photos/videos, record voice memos, store contact information, send/receive multimedia messages, browse the Internet, view/edit calendars, notes, reminders, and other documents, change device settings, provision one or more payment cards onto the device, buy/rent media from an online store, buy/rent applications from an online store, and/or access other services offered by the service provider subsystem. In at least some embodiments, any information that is related to the user and the user device may be stored on a network-based service module (e.g., module 118 in FIG. 1) as backup.

In order for the user to be able to provision payment cards onto the user device, the user may have to enable a passcode lock function on the device. The passcode lock function, when enabled, would require the user to enter a four digit passcode in order to fully operate the device. This is merely illustrative. In general, any other form of authentication method may be implemented. If the user is not able to provide the correct passcode, the device will remain in a locked state in which only an emergency call function is accessible (as an example). If the user is able to provide the correct passcode, the device will be temporarily placed in an unlocked state in which all the normal functions of the device is accessible to the user.

When the user is done performing a certain task with the device, the user may signal the device to return to the locked state (e.g., by pressing a button on the device). The device may also automatically return to the locked state when the device has been idle for a predetermined period of time (e.g., the device may be automatically locked if the device has been idle for more than one minute). The passcode function serves to protect any user information that is normally accessible through the device, since only the intended user should be able to unlock his or her device. The passcode may be locally maintained at the main processor (e.g., in the keychain 164 on applications processor 150 of FIG. 3 or in the keychain 228 on applications processor 200 of FIG. 4) and/or may be stored remotely at the service provider subsystem.

At step 306, the user may enable the passcode function by entering a desired passcode. At step 308, the trusted processor may be configured to generate a new AuthRand and may inject the newly generated AuthRand into the corresponding secure element. In accordance with an embodiment, the trust processor should also mark-for-delete all previously provisioned cards, if any, that is currently on the secure element (e.g., by updating a setting in the CRS applet that deactivates all of the payment applets in the secure element). Subsequently, the TSM module 116 at the service provider subsystem 112 (see, FIG. 1) may be used to remove all the deactivated payment credentials from the secure element.

At this point, the device may provide the user with the opportunity to provision new payment cards onto the device. For example, the user may be prompted to enter credit card numbers, security code values, expiration dates, billing addresses, answers to challenging questions, etc. Once the device has been provisioned with one or more payment cards, the device can be used to perform mobile financial transactions. In order to prevent unauthorized users from using a device that has been provisioned with commerce credentials to perform financial transactions without permission from the original intended user, the device may be configured to detect for potential risky events.

When a potential risky event is detected, the payment function of the device may be temporarily disabled and one or more steps 310 may be performed to determine whether the current user of the device is the intended user. If the current user is able to demonstrate that he or she is the intended user, then the device may return to the provisioned state and be re-enabled for payment (as indicated by return path 312).

In all other scenarios, the trusted processor may be configured to efface the previous AuthRand, generate a new AuthRand value, and inject the newly generated AuthRand value into the corresponding secure element. In at least some embodiments, the secure element may mark-for-delete all previously provisioned credentials, if any, that is currently on the secure element (e.g., by updating a setting in the CRS applet that deactivates all of the payment applets in the secure element) in response to detecting a newly injected AuthRand. Subsequently, the TSM module 116 at the service provider subsystem 112 (see, FIG. 1) may be used to remove all the marked payment credentials from the secure element. This "Mark-All-For-Delete" step ensures that all sensitive commerce credential information on the secure element has been deleted, so that the current user (whether or not he/she is the intended user) will no longer be able to access any of the previously provisioned payment cards.

At step 316, the current user may be given the opportunity to re-provision the user device (e.g., by entering new payment card numbers and associated security information). The use of AuthRand therefore serves to provide an additional level of security to help prevent the device from being used to perform unauthorized financial transactions.

In one suitable arrangement, the AuthRand that is stored on the secure element needs to actually match the AuthRand that is derived at the trusted processor in order for the user to complete a mobile transaction. This additional requirement can help combat scenarios in which the user device has been lost or stolen and in which the applications processor on the user device has been infected with malware. Even if the malware is somehow able to prevent the erasure of the previously provisioned credential information from the secure element, the trusted processor will have already generated a new AuthRand if the device is able to detect any type of ownership change or if the device is able to detect the risky event that led to the malware infection. The newly generated AuthRand will no longer be matched with the old AuthRand on the secure element, and as a result, the device will no longer be able to perform the payments function.

Figure 6:
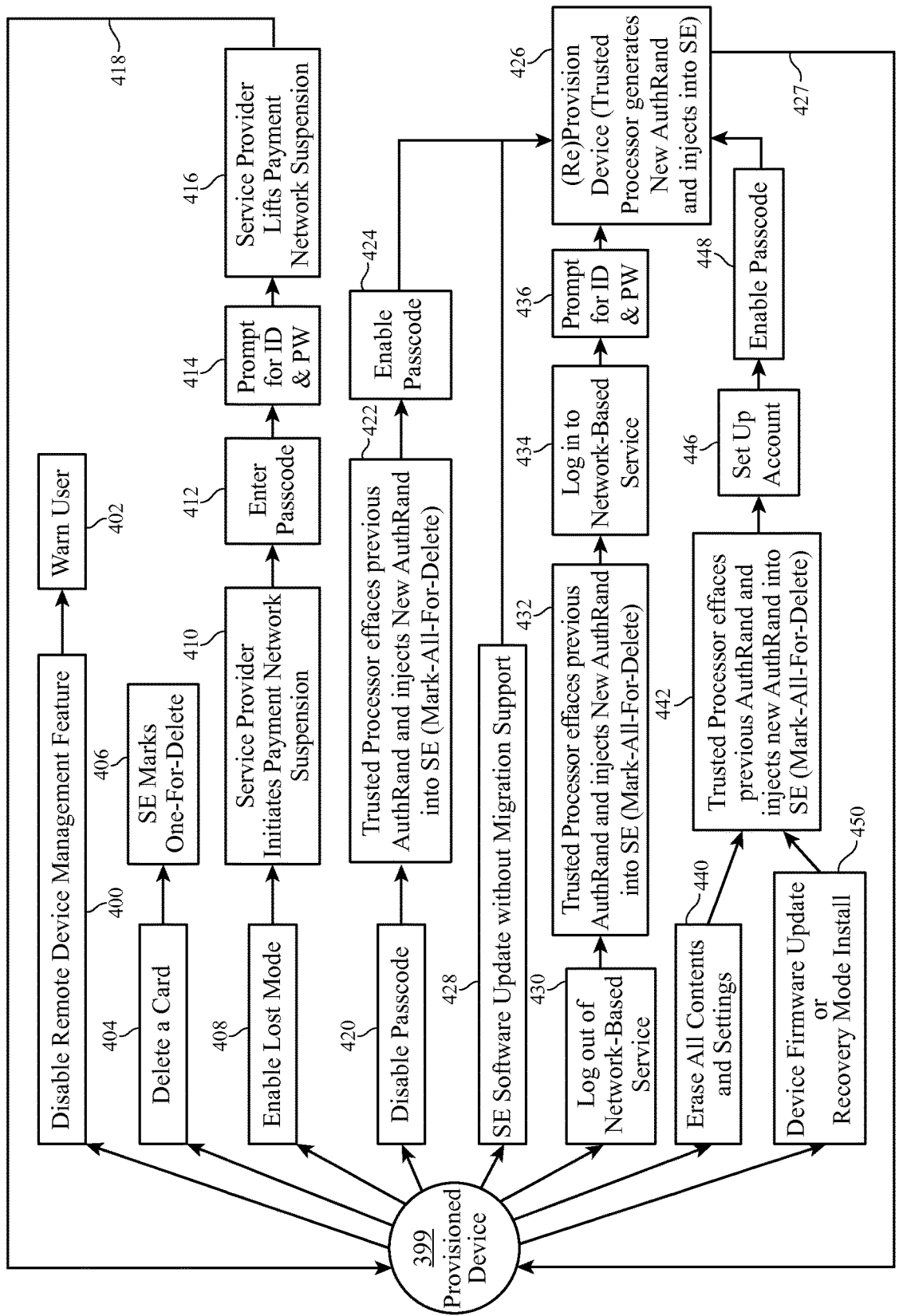
FIG. 6 is a diagram illustrating different scenarios in which a trusted processor on the electronic device erases a previous random authorization number and generates a new random authorization that is injected into a secure element on the electronic device in accordance with an embodiment.

FIG. 6 is a diagram illustrating different scenarios in which a trusted processor on a user device (e.g., trusted processor 152 on primary user device 10 of FIG. 3, trusted processor 200 on secondary user device 102 of FIG. 4, etc.) may be configured to efface a previously generated AuthRand and to generate a new AuthRand that can be injected into a secure element on the user device in accordance with an embodiment.

A user may perform the steps of the type described in connection with FIG. 5 to obtain a provisioned device 399. The provisioned device 399 should have the passcode lock function already enabled. If the device detects that a remote device management feature has been disabled by the user (step 400), the device may issue a warning to the user indicating that the device may be irrecoverable if lost or stolen (step 402). The remote device management feature may, for example, allow the user to remotely track the location of the device, to remotely lock the device by remotely placing the device in "lost mode," to remotely wipe all information from the lost/stolen device, and/or to perform other recovery functions. It may therefore be desirable (but not absolutely necessary) to keep the remote device management feature enabled on the user device.

If the device detects that the user has elected to delete a selected payment card from the device (step 404), the device may mark-for-delete the selected payment card so that the payment card is no longer selectable for payment and so that the credential information associated with that payment card will subsequently be removed from the secure element using the service provider subsystem (at step 406).

If the device detects that the user has enabled lost mode (e.g., using the remote device management service provided by the service provider subsystem) at step 408, the service provider may initiate a temporary payment network suspension (step 410). While this suspension is active, the device is not able to complete any mobile transaction because all credentials associated with that device may be temporarily deactivated at the payment network subsystem 122 (FIG. 1). If the original user is able to retrieve the lost/stolen device, he or she can enter the original passcode (step 412). The passcode entered at step 412 has to be the same as the original passcode entered prior to step 408. If the provided passcode is valid, the device may prompt the user to enter the account ID and corresponding password for his/her account that is registered at the service provider subsystem (step 414). Step 414 may or may not be necessary. If the user is able to provide the correct input at steps 412 and/or 414, the service provider may then lift the payment network suspension so that the device is again able to complete mobile transactions (step 416). The device may return to the provisioned state that is payment ready, as indicated by path 418.

If the device detects that the user has disabled the passcode function (at step 420), the trusted processor may then efface the previous AuthRand and inject a new AuthRand into the secure element while marking-for-delete all previously provisioned credentials on the secure element (step 422). When credentials on the secure element have been marked for delete (either by the trusted processor or by the secure element itself), the marked credentials on the secure element may be subsequently removed from the secure element using the trusted service manager at the service provider subsystem (as an example). If desired, step 400 or step 408 may also result in step 410 being performed.

In order for the device to be re-enabled for payment, it may be necessary for the user to again enable the passcode lock function (at step 424). The passcode entered at step 424 may be different than the original passcode entered prior to step 420. Thereafter, the trusted processor may again generate a new AuthRand that is injected into the SE (e.g., to ensure that the AuthRand at the trusted processor matches with the AuthRand at the secure element) and the user may then be given the chance to (re)provision the device with new payment cards (step 426). The injection of a new AuthRand into the secure element at step 426 may optionally result in all sensitive user data on the secure element to be erased prior to the re-provisioning event. Once the device has been (re)provisioned, the device may again be placed in the provisioned state that is payment ready, as indicated by path 427.

If the device detects that the software on the secure element has been updated without migration support (i.e., if the previous information on the secure element has not been retained or carried over during the software update) at step 428, processing may loop to step 426 so that the trusted processor can generate and inject a new AuthRand into the secure element before allowing the user to re-provision the device.

If the device detects that the user has logged out of the network-based service provided by module 118 of FIG. 1 (step 430), the trusted processor may then efface the previous AuthRand and inject a new AuthRand into the secure element while marking-for-delete all previously provisioned credentials on the secure element (step 432). When credentials on the secure element have been marked for delete (either by the trusted processor or by the secure element itself), the marked credentials on the secure element may be subsequently removed from the secure element using the service provider subsystem. In order to re-provision the device, the user may be required to log back in into the network-based service (at step 434) and enter his/her account ID and password (at step 436). Thereafter, processing may loop to step 426 so that the trusted processor can generate and inject a new AuthRand into the secure element before allowing the user to re-provision the device.

In another scenario, the device may detect that the user has elected to erase all contents and settings from the device (step 440). In yet another scenario, the device may detect that the user has elected to perform a device firmware update (DFU) or a recovery mode install to restore the device (at step 450). In either scenarios (i.e., in response to both steps 440 and 450), the trusted processor may subsequently efface the previous AuthRand and inject a new AuthRand into the secure element while marking-for-delete all previously provisioned credentials on the secure element (step 442). In order to re-provision the device, the user may be required to perform account setup (step 446, by entering account ID and password, as an example) and enable the passcode lock feature (step 448). Thereafter, processing may loop to step 426 so that the trusted processor can generate and inject a new AuthRand into the secure element before allowing the user to re-provision the device.

Figure 7:
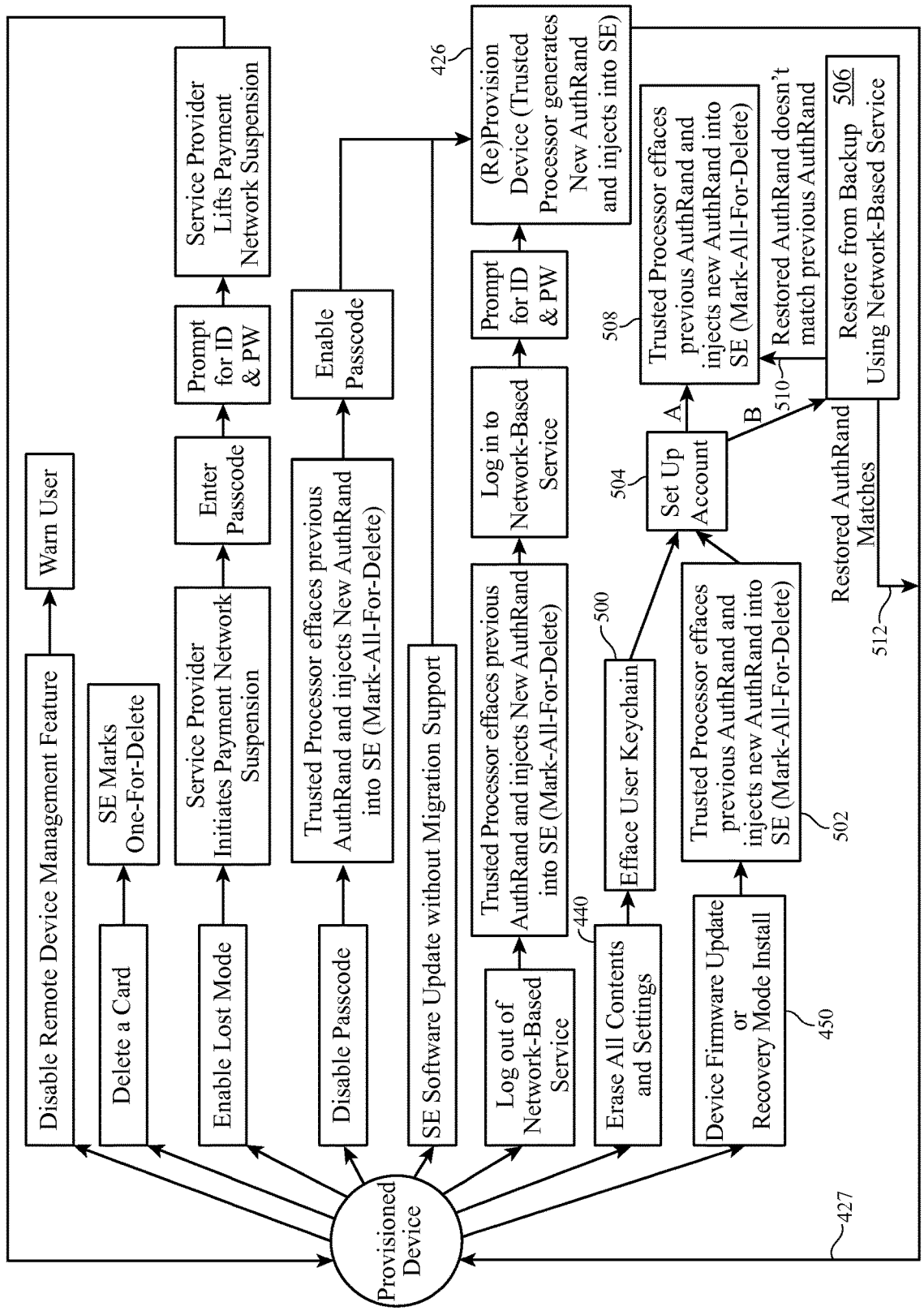
FIG. 7 is a diagram illustrating a variation of the flow in FIG. 6 showing how previously provisioned credentials may be restored from backup in accordance with an embodiment.

FIG. 7 is a diagram that shows a different variation to the flow described in connection with FIG. 6. In response to step 440, the user keychain may be erased (at step 500). Since AuthRand is either derived directly from the user keychain (as described above in connection with FIG. 3) or is actually stored on the user keychain (as described above in connection with FIG. 4), the erasure of the user keychain will prevent any further mobile transactions to be performed since the AuthRand on the secure element will no longer match the AuthRand at the trusted processor. The deletion of the user keychain at step 500 is sometimes considered to be an inherent part of steps 440 and 450.

In response to step 450, the trusted processor may subsequently efface the previous AuthRand and inject a new AuthRand into the secure element while marking-for-delete all previously provisioned credentials on the secure element (step 502). Following either step 500 or step 502, the user may be required to perform account setup (at step 502, by entering account ID and password, as an example) if he/she wishes to re-provision the device. After performing the account setup step 504, the user may be given an opportunity to select between at least two options: (i) a first option A that allows the user to provision a device from scratch; or (ii) a second option B that allows the user to automatically re-provision the device by restoring from backup the previously provisioned credentials onto the device using the network-based storage module 118 of FIG. 1.

If the user selects option A, the trusted processor may subsequently efface the previous AuthRand and inject a new AuthRand into the secure element while marking-for-delete all previously provisioned credentials on the secure element (step 508). Thereafter, processing may loop to step 426 so that the trusted processor can generate and inject a new AuthRand into the secure element before allowing the user to re-provision the device. The device may double check that the passcode lock function is still enabled prior to allowing the user to re-provision payment cards onto the device.

If the user selects option B, all the information including AuthRand and the previously provisioned credentials may be restored to the device. If desired, the user keychain stored in a most recent backup operation may be restored to the applications processor. This restored keychain (assuming that the current AuthRand value on the secure element is equal to the AuthRand stored in the most recent backup) effectively enables the trusted processor to resume secure connection with the secure element to complete mobile financial transactions at a merchant terminal, as indicated by path 512. If, however, the restored keychain does not correspond to the AuthRand value that is currently on the secure element (e.g., if the most recent backup is out-dated, resulting in a mismatch between the restored AuthRand and the AuthRand currently on the secure element), processing may proceed to step 508, as indicated by path 510.

Figure 8:
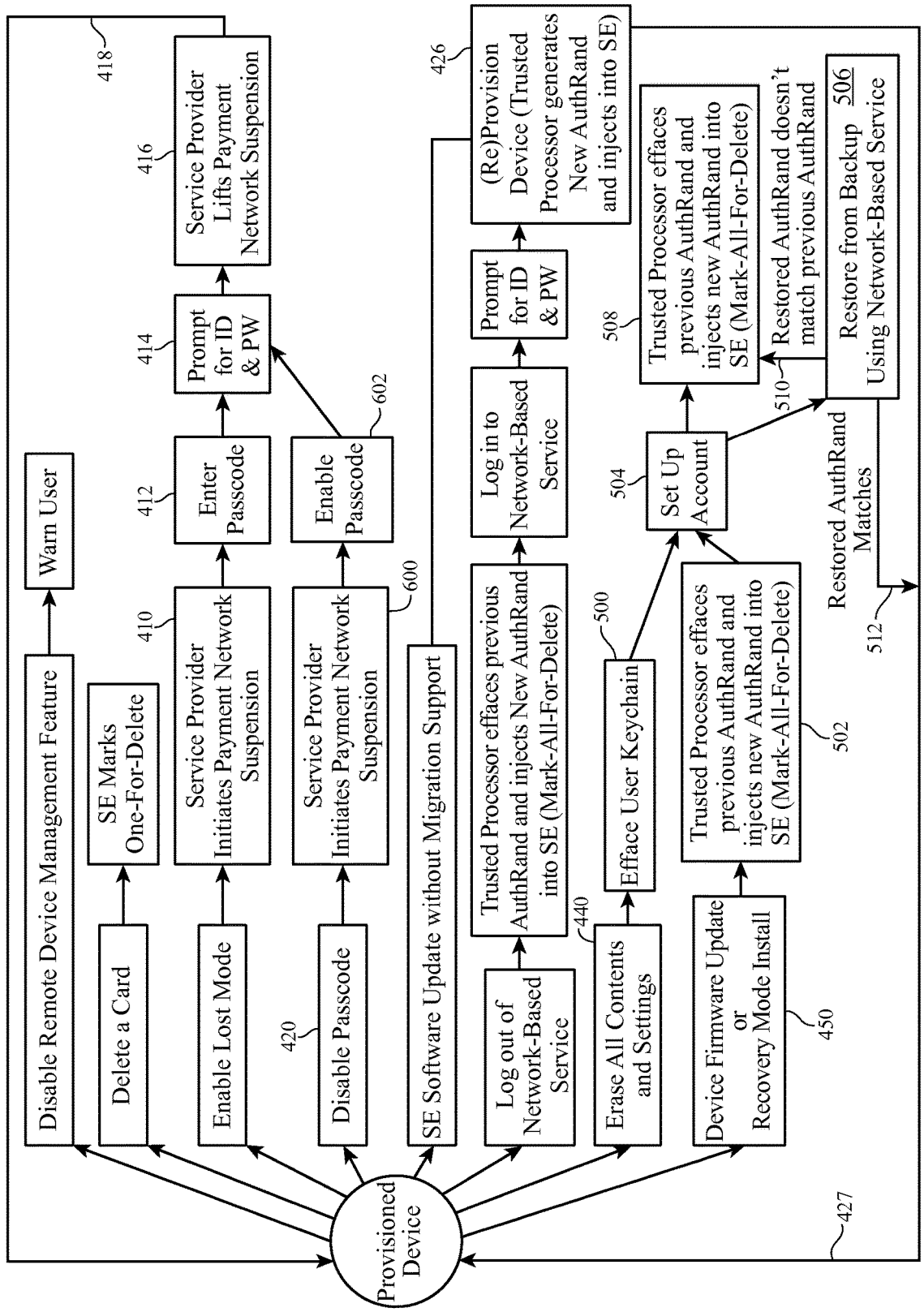
FIG. 8 is a diagram illustrating a variation of the flow in FIG. 7 showing how a user can re-enable the passcode function after disabling the passcode function to access previously provisioned credentials without having to reenter any credential information in accordance with an embodiment.

FIG. 8 is a diagram that shows a different variation to the flow described in connection with FIG. 7. If the device detects that the user has disabled the passcode lock function (at step 420), instead of erasing the previous AuthRand value as shown previously in FIGS. 6 and 7, the service provider may initiate a temporary payment network suspension (step 600). While the payment network subsystem is suspended for that device, the device is not able to complete any mobile transaction because all credentials associated with that device may be temporarily deactivated at the payment network subsystem.

In order for the device to be re-activated for payment, it may be necessary for the user to again enable the passcode lock function (at step 602). The passcode entered at step 602 may be different than the original passcode entered prior to step 420. Thereafter, the device may prompt the user to enter the account ID and corresponding password for his/her account that is registered at the service provider subsystem (step 414). Step 414 may or may not be necessary. If the user is able to provide the correct input at step 414, the service provider may then lift the payment network suspension so that the device is again able to complete mobile transactions (step 416). The device may return to the provisioned state that is payment ready, as indicated by path 418.

The approach of FIG. 8 may rely on the assumption that the user does not lose possession of the device after disabling the passcode. Even if the user loses his/her device, the new user should not be able to provide the correct user ID and password information at step 414. Operated in this way, the user can re-enable payment without having to re-provision the device from scratch if he/she decides to disable the passcode feature.

The operations of FIGS. 5-8 for enabling and disabling the payment function on a user electronic device are merely illustrative and do not serve to limit the scope of the present invention. In general, the approach of the type described in connection with FIGS. 5-8 can be extended to any device having a secure element and a corresponding trusted processor. If desired, other ways of allowing the user to re-activate the device for payment without requiring the user to re-provision payment cards onto the device from scratch in response to detecting risky behavior may be implemented.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

Although the invention has been described in some detail for the purposes of clarity, it will be apparent that certain changes and modifications can be practiced within the scope of the appended claims. Although some of the appended claims are single dependent only or reference only some of their preceding claims, their respective feature(s) can be combined with the feature(s) of any other claim.

What is claimed is:

1. A method of operating a portable electronic device, wherein the electronic device includes a secure element and an associated trusted processor, the method comprising:

with the trusted processor, storing an authorization value;

receiving one or more commerce credentials at the electronic device;

detecting, at the electronic device, a potential ownership change of the electronic device; and in response to detecting the potential ownership change at the electronic device:

disabling use of at least one of the one or more commerce credentials so that the at least one disabled commerce credential can no longer be used to conduct mobile payment transactions;

effacing the authorization value from the trusted processor;

generating by the trusted processor a new authorization value and writing the newly generated authorization value into the secure element;

detecting that the newly generated authorization value has been written into the secure element; and in response to detecting that the newly generated authorization value has been written into the secure element, removing the one or more commerce credentials from the electronic device.

2. The method defined in claim 1, further comprising: storing the authorization value only at the secure element.

3. The method defined in claim 1, further comprising: after removing the one or more commerce credentials from the electronic device, receiving one or more new commerce credentials to be provisioned onto the electronic device.

4. The method defined in claim 1, wherein detecting the potential ownership change at the electronic device comprises receiving a remote notification from a network-based service module.

5. The method defined in claim 4, further comprising: using backup data on the network-based service module to restore a previously provisioned commerce credential onto the electronic device.

6. The method defined in claim 1, further comprising: in response to detecting that an authorized user is still in possession of the electronic device, enabling use of the one or more commerce credentials so that the electronic device can be used to conduct mobile payment transactions without having to re-provision the one or more commerce credentials.

7. The method defined in claim 1, further comprising determining whether the authorization number stored at the processor compares in a predetermined manner to the authorization number stored at the secure element, in order to conduct a mobile payment transaction.

8. A portable electronic device, comprising:

a secure element on which payment card information is stored, wherein the secure element is configured to store a secure element authorization value; and a trusted processor configured to detect a potential ownership change at the electronic device, to generate a new authorization value, to write the new authorization value into the secure element in response to detecting the potential ownership change, and to delete the payment card information from the secure element upon writing the new authorization value into the secure element.

9. The portable electronic device defined in claim 8, wherein the trusted processor comprises a main processor on the electronic device.

10. The portable electronic device defined in claim 9, wherein the trusted processor is configured to maintain a keychain that includes encrypted information, and wherein the newly generated authorization value is stored in association with the keychain.

11. The portable electronic device defined in claim 8, further comprising:

an applications processor that is interposed between the trusted processor and the secure element, wherein the trusted processor comprises a secure enclave processor.

12. The portable electronic device defined in claim 11, wherein the trusted processor is configured to maintain a keychain having a universal unique identifier, wherein the trusted processor includes a monotonic counter that outputs a value, and wherein the trusted processor is configured to derive in real time the processor authorization value based at least in part on the universal unique identifier in the keychain and based at least in part on the value output by the monotonic counter.

13. A method of operating an electronic device that includes a secure element and an associated trusted processor, the method comprising:

storing payment card information on the secure element;

generating, with the trusted processor, an authorization number;

detecting a potential ownership change at the electronic device;

in response to detecting the potential ownership change, effacing the authorization number from the trusted processor so that the electronic device can no longer be used to conduct mobile payment transactions with the stored payment card information and generating by the trusted processor a new authorization number;

writing the new authorization number into the secure element and deleting the stored payment card information; and conducting a mobile payment transaction by determining whether the authorization number generated by the trusted processor matches the authorization number stored at the secure element.

14. The method of claim 13, further comprising:

enabling a lock function at the electronic device prior to storing the payment card information on the secure element.

15. The method of claim 14, wherein detecting the potential ownership change comprises detecting that the lock function has been disabled.

16. The method of claim 13, further comprising detecting that a remote device management feature on the electronic device has been disabled.

17. The method of claim 13, wherein detecting the potential ownership change comprises detecting that the electronic device has been placed in a lost mode.

18. The method of claim 13, wherein detecting the potential ownership change comprises detecting that software on the secure element has been updated without migration support.

19. The method of claim 13, wherein detecting the potential ownership change comprises detecting a log-off event at a network-based service module that stores data remotely for the electronic device.

20. The method of claim 13, wherein detecting the potential ownership change comprises detecting that one or more items of user content have been erased from the electronic device.

21. The method of claim 13, wherein detecting the potential ownership change comprises detecting a selected one of: a device firmware update or a recovery mode installation at the electronic device.

\* \* \* \* \*